(12) United States Patent
Lee et al.

(10) Patent No.: US 11,778,429 B2
(45) Date of Patent: *Oct. 3, 2023

(54) MESSAGE SERVICE PROVISION METHOD FOR PROVIDING MESSAGE SERVICE VIA OPEN CHAT ROOM CORRESPONDING TO LINK INFORMATION, AND MESSAGE SERVER AND TERMINAL FOR EXECUTING SAME

(71) Applicant: KAKAO CORP., Jeju-si (KR)

(72) Inventors: Ji Sun Lee, Yongin-si (KR); Mun Heon Kim, Yongin-si (KR); Soo Hee Kim, Yongin-si (KR); Hong Kyu Park, Suwon-si (KR); Sang Won Moon, Seoul (KR); Ki Yong Shim, Seoul (KR); Hye Jung Im, Seoul (KR)

(73) Assignee: KAKAO CORP., Jeju-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,116

(22) Filed: Nov. 15, 2021

(65) Prior Publication Data

US 2022/0078587 A1    Mar. 10, 2022

Related U.S. Application Data (63) Continuation of application No. 15/738,561, filed as application No. PCT/KR2016/006597 on Dec. 20, 2017, now Pat. No. 11,178,519.

(30) Foreign Application Priority Data

Jun. 25, 2015   (KR) .................. 10-2015-0090563

(51) Int. Cl.
*H04W 4/12*    (2009.01)
*H04L 51/04*   (2022.01)

(52) U.S. Cl.
CPC ............... *H04W 4/12* (2013.01); *H04L 51/04* (2013.01)

(58) Field of Classification Search
CPC ...................................................... H04L 51/04
See application file for complete search history.

(56) References Cited

U.S. PATENT DOCUMENTS 6,651,086 B1   11/2003  Manber et al.
7,945,620 B2    5/2011  Bou-Ghannam et al.
(Continued)

FOREIGN PATENT DOCUMENTS

CN      1794706 A       6/2006
CN    101543034 A       9/2009
(Continued)

OTHER PUBLICATIONS

Chinese Office Action for CN Application No. 201680037444.X dated Dec. 9, 2020, citing the above reference(s).
(Continued)

*Primary Examiner* — Esther B. Henderson
(74) *Attorney, Agent, or Firm* — CANTOR COLBURN LLP (57) ABSTRACT

Disclosed are a message service provision method for providing a message service via an open chat room corresponding to link information, and a message server and a terminal for executing the message service provision method. The message service provision method comprises the steps of: transmitting, to a message server, a request for issuing link information for an open chat room via a message application; receiving, from the message server, link information generated in response to the request for issuing link information; sharing the link information according to a request for sharing inputted by a user of a host terminal; and performing chatting with a user of a guest terminal partici- (Continued)

pating in the open chat room by means of the shared link information; wherein the user of the guest terminal and the user of the host terminal are users who subscribed to a message service provided via the message server.

20 Claims, 6 Drawing Sheets

(56) References Cited

U.S. PATENT DOCUMENTS

| | | | |
|---|---|---|---|
| 2002/0184391 | A1 | 12/2002 | Phillips |
| 2003/0101343 | A1 | 5/2003 | Eaton et al. |
| 2007/0286169 | A1 | 12/2007 | Roman |
| 2007/0288560 | A1 | 12/2007 | Bou-Ghannam et al. |
| 2009/0313550 | A1 | 12/2009 | Kim et al. |
| 2010/0005402 | A1 | 1/2010 | George et al. |
| 2012/0110099 | A1 | 5/2012 | Fujihara et al. |
| 2013/0311906 | A1* | 11/2013 | Mackin .......... H04L 51/52 709/204 |
| 2015/0026273 | A1* | 1/2015 | Yoon .......... H04L 51/04 709/206 |
| 2015/0256353 | A1 | 9/2015 | Busey et al. |
| 2016/0247124 | A1 | 8/2016 | Holst et al. |

FOREIGN PATENT DOCUMENTS

| | | |
|---|---|---|
| CN | 103227796 A | 7/2013 |
| CN | 103490991 A | 1/2014 |
| CN | 104348706 A | 2/2015 |
| JP | 10334021 A | 12/1998 |
| JP | 2004-240932 A | 8/2004 |
| JP | 2010512062 A | 4/2010 |
| JP | 2010140245 A | 6/2010 |
| JP | 2013134777 A | 7/2013 |
| JP | 201490247 A | 5/2014 |
| JP | 2014209320 A | 11/2014 |
| JP | 2015504558 A | 2/2015 |
| KR | 1020060000027 A | 1/2006 |
| KR | 100673169 B1 | 1/2007 |
| KR | 1020090086621 A | 8/2009 |
| KR | 1020130039231 A | 4/2013 |
| KR | 1020130073101 A | 7/2013 |

OTHER PUBLICATIONS

International Search Report dated Sep. 21, 2016 for PCT/KR2016/006597, citing the above references.

* cited by examiner

MESSAGE SERVICE PROVISION METHOD FOR PROVIDING MESSAGE SERVICE VIA OPEN CHAT ROOM CORRESPONDING TO LINK INFORMATION, AND MESSAGE SERVER AND TERMINAL FOR EXECUTING SAME

This application is a continuation of U.S. patent application Ser. No. 15/738,561, filed on Dec. 20, 2017, which claims priority to Korean Patent Application No. 10-2015-0090563, filed on Jun. 25, 2015, and all the benefits accruing therefrom under 35 U.S.C. § 119 and § 120, the contents of which in their entirety are herein incorporated by reference.

TECHNICAL FIELD

Example embodiments relate to a method of providing a messaging service through an open chat room corresponding to link information and a device performing the method, and more particularly, to a messaging service providing method and device that allows a user to participate and chat in an open chat room through link information irrespective of whether the user is a friend or not.

BACKGROUND ART

As instant messaging services are widely used, various functions needed for such services have been suggested. An instant messaging service is a service through which messages are transmitted and/or received in real time in a chat room that enables a one-to-one (1:1) chat or a group chat based on a network.

An instant messaging service is fundamentally a service that delivers messages between users who are friends with each other in a messaging application. However, as the Internet is more widely used, there has also been an increase in exchanges with nonacquintances who are not friends through various online communities or cafes.

To exchange instant messages with such nonacquintances, a user may experience inconvenience because the user needs to share personal information such as, for example, a phone number and identification (ID) used in a messaging application, and may also take a risk of exposing such personal information to the nonacquintances.

Thus, there is a desire for a method of exchanging instant messages with a nonacquintance in a messaging application, without exchanging personal information such as a phone number and an ID used in the messaging application.

DISCLOSURE OF INVENTION

Technical Goals

Example embodiments provide a method and device that may allow a user to participate and chat in an open chat room through link information, and readily exchange messages with a nonacquintance without exchanging personal information, for example, a phone number and identification (ID) used in a messaging application.

Example embodiments also provide a method and device for providing a messaging service that may minimize an exposure of personal information by separately setting a profile to be used in an open chat room.

Example embodiments also provide a method and device that may allow a user to readily use an instant messaging service by allowing the user to exchange messages only through shared link information without exchanging a phone number or an ID of the user in a messaging application.

Technical Solutions

According to an example embodiment, there is provided a messaging service providing method to be performed by a host terminal, the method including transmitting, to a messaging server, a link information issuance request for issuing link information for an open chat room through a messaging application, receiving, from the messaging server, the link information generated in response to the link information issuance request, sharing the link information in response to a link information sharing request input by a user of the host terminal, and performing a chat between the user of the host terminal and a user of a guest terminal participating in the open chat room through the shared link information. The user of the guest terminal and the user of the host terminal may subscribe to a messaging service provided through the messaging server.

A profile of the user of the host terminal in the open chat room may be set to be one of a default profile displayed to a friend of the user of the host terminal in the messaging application, and an open profile set when the link information issuance request is transmitted to the messaging server or the user participates in the open chat room.

The link information issuance request may include at least one of user information associated with the user of the host terminal, requirement information associated with the user of the guest terminal, type information indicating whether the open chat room is a one-to-one type or a group type, requirement information associated with the open chat room, or connection information of the open chat room.

The sharing of the link information may include posting the link information in a posting space including at least one of an webpage accessible by the guest terminal or an online space in the messaging application or another service application different from the messaging application.

The open chat room may be generated when the link information is generated in response to the link information issuance request, or generated when the shared link information is selected by the user of the guest terminal.

The open chat room may be displayed to be distinguishable from a general chat room in which a chat between the user of the host terminal and a friend of the user of the host terminal is performed in the messaging application.

The host terminal may display at least one of the number of open chat rooms corresponding to the link information or the number of new messages received in the open chat room corresponding to the link information. When there are a plurality of open chat rooms corresponding to the link information, the host terminal may display at least one group into which the open chat rooms are grouped. When the displayed at least one group is selected, the host terminal may display a list of open chat rooms included in the selected group.

When the user of the host terminal leaves the open chat room, the open chat room may be deleted from the messaging server after a predetermined period elapses.

According to another example embodiment, there is provided a messaging service providing method to be performed by a guest terminal, the method may include receiving an input indicating that link information posted in a posting space is selected, and performing a chat between a user of the guest terminal and a user of a host terminal by participating in an open chat room generated by a messaging server through the link information. The user of the guest terminal and the user of the host terminal may subscribe to a messaging service provided by the messaging server in association with a messaging application. The link information may be generated by the messaging server in response to a link information issuance request for issuing the link information for the open chat room.

The host terminal may be a terminal requesting the issuing of the link information, a terminal associated with a virtual entity using the open chat room through the link information, or a terminal designated by the link information.

A profile of the user of the guest terminal in the open chat room may be set to be one of a default profile displayed to a friend of the user of the guest terminal in the messaging application, and an open profile set when the link information issuance request is transmitted to the messaging server or the user participates in the open chat room.

According to still another example embodiment, there is provided a messaging service providing method to be performed by a messaging server, the method including generating link information in response to a link information issuance request for issuing the link information for an open chat room, and providing a messaging service through the open chat room in which a chat between a user of a guest terminal selecting the link information and a user of a host terminal is performed. The user of the guest terminal and the user of the host terminal may subscribe to the messaging service provided through the messaging server. The user of the guest terminal may participate in the open chat room by selecting the link information shared by the host terminal.

The link information issuance request may include at least one of user information associated with the user of the host terminal, requirement information associated with the user of the guest terminal, type information indicating whether the open chat room is a one-to-one type or a group type, requirement information associated with the open chat room, or connection information of the open chat room.

When a user of a host terminal and a plurality of users of guest terminals are participating in the open chat room through the link information, the user of the host terminal may participate in an open chat room of a one-to-one type to chat with each of the users of the guest terminals, or participate in an open chat room of a group type to chat with the users of the guest terminals.

When a plurality of users of host terminals and a plurality of users of guest terminals are participating in the open chat room through the link information, the user of the host terminal may be a user among a plurality of users of host terminals associated with a virtual entity, and may be allocated to participate in an open chat room that is the same as an open chat room in which at least one user among the users of the guest terminals is participating and chatting.

The user of the host terminal may be allocated based on order in which the users of the host terminals associated with the virtual entity log into a messaging application, allocated based on the number of open chat rooms previously allocated to the users of the host terminals associated with the virtual entity, or allocated based on the number of users of guest terminals participating in the open chat rooms previously allocated to the users of the host terminals associated with the virtual entity.

The host terminal may be a terminal requesting the issuing of the link information, a terminal associated with the virtual entity using the open chat room through the link information, or a terminal designated by the link information.

According to yet another example embodiment, there is provided a host terminal performing a messaging service providing method, the host terminal including a memory in which the messaging service providing method is stored and a processor configured to implement the messaging service providing method. The processor may transmit, to a messaging server, a link information issuance request for issuing link information for an open chat room through a messaging application, receive, from the messaging server, the link information generated in response to the link information issuance request, share the link information for the open chat room in response to a link information sharing request input by a user of the host terminal, and perform a chat between the user of the host terminal and a user of a guest terminal participating in the open chat room through the shared link information. The user of the guest terminal and the user of the host terminal may subscribe to a messaging service provided through the messaging server.

According to further another example embodiment, there is provided a guest terminal performing a messaging service providing method, the guest terminal including a memory in which the messaging service providing method is stored and a processor configured to implement the messaging service providing method. The processor may receive an input indicating that link information posted in a posting space is selected, and perform a chat between a user of the guest terminal and a user of a host terminal by participating in an open chat room generated in a messaging application through the link information. The user of the guest terminal and the user of the host terminal may subscribe to a messaging service provided by a messaging server in association with the messaging application, and the link information may be generated by the messaging server in response to a link information issuance request for issuing the link information for the open chat room.

Advantageous Effects

According to example embodiments described herein, a user may participate and chat in an open chat room through link information, and readily exchange messages with a nonacquintance without exchanging personal information, for example, a phone number and an identification (ID) of the user in a messaging application.

According to example embodiments described herein, by separately setting a profile to be used in an open chat room, an exposure of personal information of a user may be minimized in using a messaging service.

According to example embodiments described herein, a user may readily use an instant messaging service by exchanging messages only through shared link information without exchanging a phone number or an ID of the user in a messaging application.

BEST MODE FOR CARRYING OUT THE INVENTION

Reference will now be made in detail to example embodiments, examples of which are illustrated in the accompanying drawings, wherein like reference numerals refer to the like elements throughout. The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. In addition, various changes, modifications, and equivalents of the methods, apparatuses, and/or systems described herein will be apparent after an understanding of the disclosure of this application. Also, descriptions of features that are known in the art may be omitted for increased clarity and conciseness.

The terminology used herein is for describing various examples only, and is not to be used to limit the disclosure. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 1:
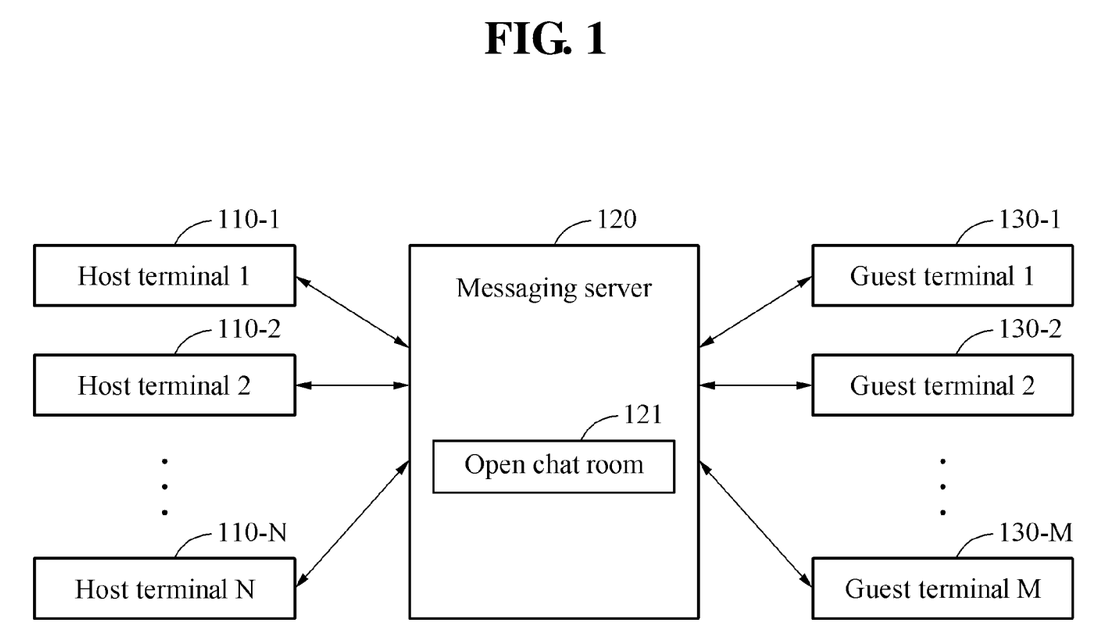
FIG. 1 is a diagram illustrating devices that perform a messaging service providing method according to an example embodiment.

FIG. 1 is a diagram illustrating devices that perform a messaging service providing method according to an example embodiment.

FIG. 1 illustrates at least one host terminal, for example, host terminals 110-1, 110-2, . . . , and 110-N, a messaging server 120, and at least one guest terminal, for example, guest terminals 130-1, 130-2, . . . , and 130-M. A host terminal and a guest terminal used herein refer to a terminal that performs a chat or chatting through a messaging application and may be embodied by, for example, a software module, a hardware module, or a combination thereof. The host terminal and the guest terminal may also be various computing devices and/or systems, for example, a smartphone, a tablet computer, a laptop computer, a desktop computer, and a wearable device. According to an example embodiment, each of the host terminal and the guest terminal may include a memory and a processor. The memory may store a messaging service providing method to be described hereinafter, and the processor may implement the messaging service providing method. In addition, host terminals and guest terminals used herein may be terminals having different user information, for example, user identifications (IDs), in a messaging service.

The host terminal (for example, the host terminals 110-1, 110-2, . . . , and 110-N as illustrated) may exchange at least one instant messages with the guest terminal (for example, the guest terminals 130-1, 130-2, . . . , and 130-M as illustrated) through link information. For such an exchange, the host terminal (110-1, 110-2, . . . , and 110-N) or the guest terminal (130-1, 130-2, . . . , and 130-M) may install a messaging application associated with the messaging server 120.

Hereinafter, a chat room in which a user participates through link information will be referred to as an open chat room, for example, an open chat room 121. The open chat room is a chat room in which a user participates through link information regardless of whether the user is a friend or not in a messaging application. Thus, a user of the host terminal (110-1, 110-2, . . . , and 110-N) and a user of the guest terminal (130-1, 130-2, . . . , and 130-M) may not need to be friends of each other. However, the user of the host terminal (110-1, 110-2, . . . , and 110-N) and the user of the guest terminal (130-1, 130-2, . . . , and 130-M) may subscribe to the same messaging service provided through the messaging server 120. Thus, the open chat room 121 may be distinguished from a general chat room in which a chat between users who are friends of each other is performed. The open chat room 121 may be a one-to-one type open chat room in which a user chats with another user one-to-one or a group type open chat room in which at least three users participate to chat with one another.

Here, link information is information associated with a link to the open chat room 121. The link information may be provided in a form, for example, a custom uniform resource locator (URL) scheme, a hyper text transfer protocol (http) URL, a quick response (QR) code, a highlighted text, and an icon. The custom URL scheme may be a type of link information that executes an application. The http URL may be a type of link information that is linked to a predetermined webpage. The QR code may be a two-dimensional (2D) barcode that represents information in a black and white grid pattern and include, for example, information linking to a predetermined webpage. The highlighted text may be a form of text with an outward shape of all or part of the text is modified, and may include link information linked to a predetermined webpage. The icon is a pictorial symbol that indicates an object, a facility, a form, a concept, and the like as a symbolic illustration to be readily recognizable, and may include information linked to a predetermined webpage.

For example, a user of a terminal selecting such link information may participate in the open chat room 121. In detail, when the guest terminal (130-1, 130-2, . . . , and 130-M) receives an input indicating that link information of the custom URL scheme type is selected, the guest terminal (130-1, 130-2, . . . , and 130-M) may execute the messaging application to allow the user of the guest terminal (130-1, 130-2, . . . , and 130-M) to participate in the open chat room 121 corresponding to the link information. Alternatively, when the guest terminal (130-1, 130-2, . . . , and 130-M) receives an input indicating that link information of the http URL type, the QR code type, the highlighted text type, or the icon type is selected, the guest terminal (130-1, 130-2, . . . , and 130-M) may access a predetermined webpage and execute the messaging application through the link information included in the webpage to allow the user of the guest terminal (130-1, 130-2, . . . , and 130-M) to participate in the open chat room 121.

For another example, when a terminal receiving an input indicating that link information is selected is not able to participate in the open chat room 121, the link information may be transferred to another terminal. Such a case where the terminal receiving an input indicating that link information is selected is not able to participate in the open chat room 121 may include, for example, a case in which the messaging application associated with the messaging server 120 is not installed in the terminal, or a case in which the messaging application installed in the terminal does not support a participation in the open chat room 121 through the link information. A user of the other terminal receiving the link information may participate in the open chat room 121 through the link information.

There may be a single or a plurality of users of host terminals (e.g., 110-1, 110-2, . . . , and 110-N) and guest terminals (e.g., 130-1, 130-2, . . . , and 130-M), respectively, who participate in the open chat room 121 through the link information and exchange instant messages therein.

The providing of the messaging service may be more readily understood using the following cases in which there are a single or a plurality of users of host terminals (110-1, 110-2, . . . , and 110-N) and guest terminals (130-1, 130-2, . . . , and 130-M), respectively, who participate in the open chat room 121 through the link information and exchange instant messages therein.

(1) Case 1: A user of a host terminal and a user of a guest terminal exchange instant messages through an open chat room based on link information.

According to an example, it may be assumed that a user of a host terminal and a single user of a guest terminal exchange instant messages therebetween through an open chat room based on link information. In such a case, the user of the host terminal and the user of the guest terminal may chat with each other in the open chat room 121 in which the user of the host terminal and the user of the guest terminal participate through the link information.

Here, the open chat room 121 may be generated when the link information is generated by the messaging server 120 in response to a link information issuance request for issuing the link information, or generated when the link information posted in a posting space is selected by the user of the guest terminal.

Here, the host terminal may be a terminal that requests the issuing of the link information, or a terminal designated by the link information.

(2) Case 2: A user of a host terminal and a plurality of users of guest terminals exchange instant messages through an open chat room based on link information.

According to an example, it may be assumed that a user of a host terminal and a plurality of users of guest terminals exchange instant messages therebetween through an open chat room based on link information. In such a case, implementation may vary based on a type of an open chat room in which a user participates through link information. For example, the implementation may vary based on whether the type is a one-to-one type or a group type.

Here, when the open chat room 121 is a one-to-one type open chat room, the user of the host terminal and a user of a guest terminal may participate in the one-to-one type open chat room through the link information to chat with each other one-to-one. When the plurality of guest terminals receive an input indicating that the link information is selected, the one-to-one type open chat room may be generated for each of the users of the guest terminals to chat with the same user of the host terminal.

However, a maximum allowable number of open chat rooms 121 to be generated through link information may be set by the host terminal or the messaging server 120. The number of open chat rooms 121 to be generated through the link information may be restricted not to exceed the maximum allowable number that is set in advance, and also the number of users of guest terminals to participate in the open chat rooms 121 through the link information may also be restricted by the maximum allowable number of the open chat rooms 121.

However, when the open chat room 121 is a group type open chat room, the user of the host terminal and the plurality of users of guest terminals participating in such an open chat room through the link information may participate in the group type open chat room to chat therein. Here, the maximum allowable number of users of guest terminals participating in such open chat rooms 121 may be set by the host terminal or the messaging server 120. In such a case, when the number of users of guest terminals participating in the open chat rooms 121 through the link information reaches the preset maximum allowable number, a user of a guest terminal that selects the link information afterwards may participate in a group type open chat room that is newly generated. Such a newly generated group type open chat room may also be restricted by the maximum allowable number of the open chat rooms 121 that may be generated through the link information.

Alternatively, when the open chat room 121 includes both a one-to-one type open chat room and a group type open chat room, the descriptions provided above as in the case of the one-to-one type open chat room and the case of the group type open chat room may be applied, and thus a more detailed and repeated description is omitted here for clarity and brevity.

Here, the host terminal may be a terminal that requests issuing the link information, or a terminal designated by the link information.

(3) Case 3: A plurality of users of host terminals and a plurality of users of guest terminals exchange instant messages through an open chat room based on link information.

According to an example, it may be assumed that a plurality of users of host terminals and a plurality of users of guest terminals exchange instant messages therebetween through an open chat room based on link information. In such a case, the users of the host terminals may be associated with a virtual entity. The virtual entity is an entity that represents an organization, a group, a company, or others that desires to use the open chat room 121.

A messaging service using such a virtual entity may be provided through a same single ID of the virtual entity in the open chat room 121. However, an actual user who chats with a user of a guest terminal using the ID of the virtual entity may be one of the users of the host terminals associated with the virtual entity. The virtual entity may be used to organize a seminar, a workshop, and others, or perform tasks such as customer management, business support, and product sales based on a purpose of an organization, a group, a company, or others. The virtual entity may use the messaging service to chat with a greater number of users of guest terminals through the plurality of host terminals.

When there are the plurality of users of host terminals and the plurality of users of guest terminals, implementation may also vary based on a type of an open chat room in which a user participates through the link information. For example, the implementation may vary based on whether the type is a one-to-one type or a group type.

When the open chat room 121 is a one-to-one type open chat room, a single open chat room 121 may be assigned or allocated to each of users of guest terminals selecting the link information.

Thus, open chat rooms 121 may be generated by the number of the users of the guest terminals to participate therein through the link information. However, the number of the open chat rooms 121 may be restricted by the preset maximum allowable number of open chat rooms 121. That is, the number of the open chat rooms 121 to be generated through the link information may be restricted not to exceed the maximum allowable number of the open chat rooms 121.

One of the users of the host terminals may be allocated to the one-to-one type open chat room 121. Here, the users of the host terminals may be allocated, as participants, to at least one open chat room 121 randomly or in a predetermined order.

For example, the users of the host terminals may be allocated to open chat rooms 121 based on an order in which the users of the host terminals log into the messaging application. A user who logs into the messaging application faster among the users of the host terminals, the user may be preferentially allocated to a newly generated open chat room 121. Also, the users of the host terminals may be allocated to the open chat rooms 121 based on the number of open chat rooms previously allocated to the user of the host terminals. For example, a user with a less number of the previously allocated open chat rooms among the users of the host terminals may be preferentially allocated to an open chat room.

However, when the open chat room 121 is a group type open chat room, a user of a guest terminal selecting the link information may participate in the group type open chat room.

The number of users of guest terminals to participate in the open chat room 121 through the link information may be set in advance. Here, when the number of the users of the guest terminals participating in the open chat room 121 reaches the preset maximum allowable number of users of guest terminals, a user of a guest terminal selecting the link information afterwards may participate in a group type open chat room that is newly generated.

One of the users of the host terminals may be allocated to the group type open chat room 121. Here, the users of the host terminals may be allocated, as participants, to at least one open chat room 121 randomly or in a predetermined order.

In addition, the users of the host terminals may be allocated based on an order in which the users of the host terminals associated with the virtual entity log into the messaging application, allocated based on the number of open chat rooms previously allocated to the users of the host terminals associated with the virtual entity, or allocated to the group type open chat room 121 based on the number of users of guest terminals participating in the open chat rooms previously allocated to the users of the host terminals associated with the virtual entity.

The users of the host terminals may be allocated by the messaging server 120, or a server associated with the virtual entity that is associated with the users of the host terminals.

The host terminals may include at least one of a terminal requesting the issuing of the link information, a terminal associated with the virtual entity using the open chat room 121 through the link information, or a terminal designated by the link information.

According to the examples described above, at least one of a type of an open chat room 121, a maximum allowable number of open chat rooms 121 to be generated through link information, a maximum allowable number of users of host terminals or a maximum allowable number of users of guest terminals that participate in an open chat room 121, or an entry requirement to enter an open chat room 121 may be set by a terminal, for example, a host terminal, or a messaging server that generates the link information, or a virtual entity managing server.

Hereinafter, how a user of a host terminal 110 among the host terminals 110-1, 110-2, . . . , and 110-N and a user of a guest terminal 130 among the guest terminals 130-1, 130-2, . . . , and 130-M participate in an open chat room 121 through link information will be described. Examples to be described hereinafter may also be identically applied to each of the host terminals 110-1, 110-2, . . . , and 110-N.

The host terminal 110 may transmit, to the messaging server 120, a link information issuance request for issuing link information for an open chat room 121. The link information issuance request may include user information associated with the user of the host terminal 110, requirement information associated with the user of the guest terminal 130, type information indicating whether the open chat room 121 is of a one-to-one type or a group type, requirement information associated with the open chat room 121, or connection information of the open chat room 121.

The user information associated with the user of the host terminal 110 may be information associated with the user using the host terminal 110 and include, for example, profile information of the user of the host terminal 110 or information of a virtual entity associated with the host terminal 110.

The profile information of the user of the host terminal 110 is information of a profile to be used in the open chat room 121, and may include information of at least one of a default profile or an open profile. The default profile is a profile of the user of the host terminal 110 that is displayed to a friend of the user of the host terminal 110 in the messaging application, and may be set when the user of the host terminal 110 subscribes to the messaging service and also be changeable after the default profile is set. That is, the default profile may be a profile used when a user chats with a user who is a friend of the user in the messaging application. The open profile may be a profile that is set when the link information issuance request for issuing the link information for the open chat room 121 is transmitted to the messaging server 120 or the user participates in the open chat room 121, and may be additionally set in addition to the default profile. In general, dissimilar to the default profile that includes personal information including, for example, a face image of a user, the open profile that does not include such personal information. Thus, by additionally setting the open profile, a risk of leakage of personal information of the user of the host terminal 110 may be minimized.

The information of the virtual entity is information associated with the virtual entity that desires to use the open chat room 121 through the host terminal 110. Here, the virtual entity is an entity that represents an organization, a group, a company, and others that desire to use the open chat room 121. The virtual entity may be used to organize a seminar, a workshop, and others, or perform tasks such as customer management, business support, and product sales based on a purpose of an organization, a group, a company, or others. The information of the virtual entity may include information of a plurality of host terminals associated with the virtual entity, for example, ID information of users of the host terminals.

The requirement information associated with the user of the guest terminal 130 is information associated with requirements of the user of the guest terminal 130 that may participate in the open chat room 121. The requirement information associated with the user of the guest terminal 130 may include, for example, personal information including, for example, a gender, an age, an address, an academic background, and a company of the user of the guest terminal 130. The personal information of the user of the guest terminal 130 may be information input by the user of the guest terminal 130 when the user of the guest terminal 130 subscribes to the messaging service.

The type information associated with the open chat room 121 may include information indicating whether the open chat room 121 is of a one-to-one type or a group type. When the open chat room 121 is a one-to-one type open chat room, a single one-to-one type open chat room may be generated for each of users of guest terminals participating in the open chat room 121 through the link information. Here, the number of one-to-one type open chat rooms to be generated may be restricted by a maximum allowable number of open chat rooms 121. That is, the number of the one-to-one type open chat rooms to be generated through the link information may be restricted not to exceed the maximum allowable number of the open chat rooms 121.

The requirement information associated with the open chat room may include at least one of information associated with the maximum allowable number of the open chat rooms 121 to be generated through the link information, a maximum allowable number of users of host terminals participating in the open chat room 121 or a maximum allowable number of users of guest terminals participating in the open chat room 121, or entry requirement information associated with a requirement for an entry into the open chat room 121.

When the open chat room 121 is a group type open chat room, the user of the guest terminal 130 selecting the link information may participate in a previously generated group type open chat room, and the number of users of guest terminals participating in a group type open chat room may be restricted by the preset maximum allowable number of users of guest terminals. That is, the number of users of guest terminals participating in the group type open chat room through the link information may be restricted not to exceed the maximum allowable number of users of guest terminals. For example, when the number of users of guest terminals participating in the group type open chat room through the link information is restricted by the maximum allowable number of users of guest terminals, a group type open chat room may be newly generated. Here, the user of the guest terminal 130 participating in the open chat room 121 through the link information may participate in the newly generated group type open chat room to chat with the user of the host terminal 110.

Although the maximum allowable number of users of host terminals participating in the open chat room 121 is fundamentally set to be one, the maximum allowable number may be set to be two or more as needed. When the maximum allowable number of users of host terminals is set to be two or more, users of at least two host terminals may participate in a same open chat room 121 and chat with users of guest terminals.

The entry requirement information is information associated with a requirement for an entry into an open chat room 121 and may include, for example, information on whether the link information is activated or not, information on a password for the open chat room 121, or information on a time limit set for the open chat room 121. For example, when the information on whether the link information is activated indicates that the link information is inactivated, the user of the guest terminal 130 may not participate in the open chat room 121 although the user of the guest terminal 130 selects the link information. When it is determined that all users of guest terminals entering the open chat room 121 through the link information are not readily manageable, the user of the host terminal 110 may inactivate the link information to restrict an additional user of a guest terminal from participating the open chat room 121.

In addition, when a password is set for the open chat room 121, the user of the guest terminal 130 may not participate in the open chat room 121 when the user of the guest terminal 130 does not input the password included in the entry requirement information, although the user of the guest terminal 130 selects the link information.

The information on a time limit is information on a time limit set for the open chat room 121 and may include, for example, information on a time that is maintained with the open chat room 121 being undeleted after the open chat room 121 is generated, information on a time at which the link information is activated, or information on a time at which the open chat room 121 is deleted. For example, when the user of the guest terminal 130 is trying to participate in the open chat room 121 through the link information at a time at which the link information is not activated, the user of the guest terminal 130 may not participate in the open chat room 121.

The connection information of the open chat room 121 is information associated with a connection between the user of the host terminal 110 and the user of the guest terminal 130 participating in the open chat room 121. The connection information may be, for example, information associated with a user of a certain host terminal participating in the open chat room 121. Here, the host terminal may be a terminal requesting of the issuing of the link information, a terminal associated with the virtual entity using the open chat room 121 through the link information, or a terminal designated by the link information. The connection information may also be information indicating how at least one of users of host terminals associated with the virtual entity is to be allocated to the open chat room 121 in which the user of the guest terminal 130 participates.

The messaging server 120 may generate the link information in response to the link information issuance request, and transmit the generated link information to the host terminal 110. The host terminal 110 may share the link information for the open chat room 121 that is received from the messaging server 120.

The user of the guest terminal (e.g., 130-1, 130-2, . . . , and 130-M) may then participate in the open chat room 121 through the link information, and chat with the user of the host terminal (e.g., 110-1, 110-2, . . . , and 110-N).

According to an example, when there are a plurality of open chat rooms 121 corresponding to the link information, the user of the host terminal may experience inconvenience by repetitively inputting a same message in each of the open chat rooms 121 to deliver the same message, for example, a notice message, to each of the open chat rooms 121. Here, the user of the host terminal may deliver such a notice message to the open chat rooms 121 at one time through a notice message-related interface in the messaging application. The notice message is a message to be notified to the user of the guest terminal (130-1, 130-2, . . . , and 130-M) participating in the open chat rooms 121, and may be displayed in an area of the open chat rooms 121, for example, an upper end of the open chat rooms 121 and a popup, or displayed between messages exchanged in the open chat rooms 121 based on a message transmission time.

In addition, a user of a terminal participating in a group type open chat room may also have a one-to-one chat with one of users of other terminals participating in the group type open chat room. Here, the one-to-one chat may be performed in an additionally generated one-to-one type open chat room, or be performed through a whisper function in the group type open chat room. The whisper function is a function through which users of predetermined terminals in a previously generated group type open chat room may exchange one-to-one messages without generating an additional one-to-one type open chat room.

In addition, voice-based messages, in addition to text-based instant messages, may also be exchanged or transmitted in the open chat room 121, and a voice call may be performed among users of terminals participating in the open chat room 121. Further, payments for products and remittance of money may be performed among users of terminals participating in the open chat room 121, or a message for 'gift' supported in the messaging application may also be transmitted or received.

Figure 2:
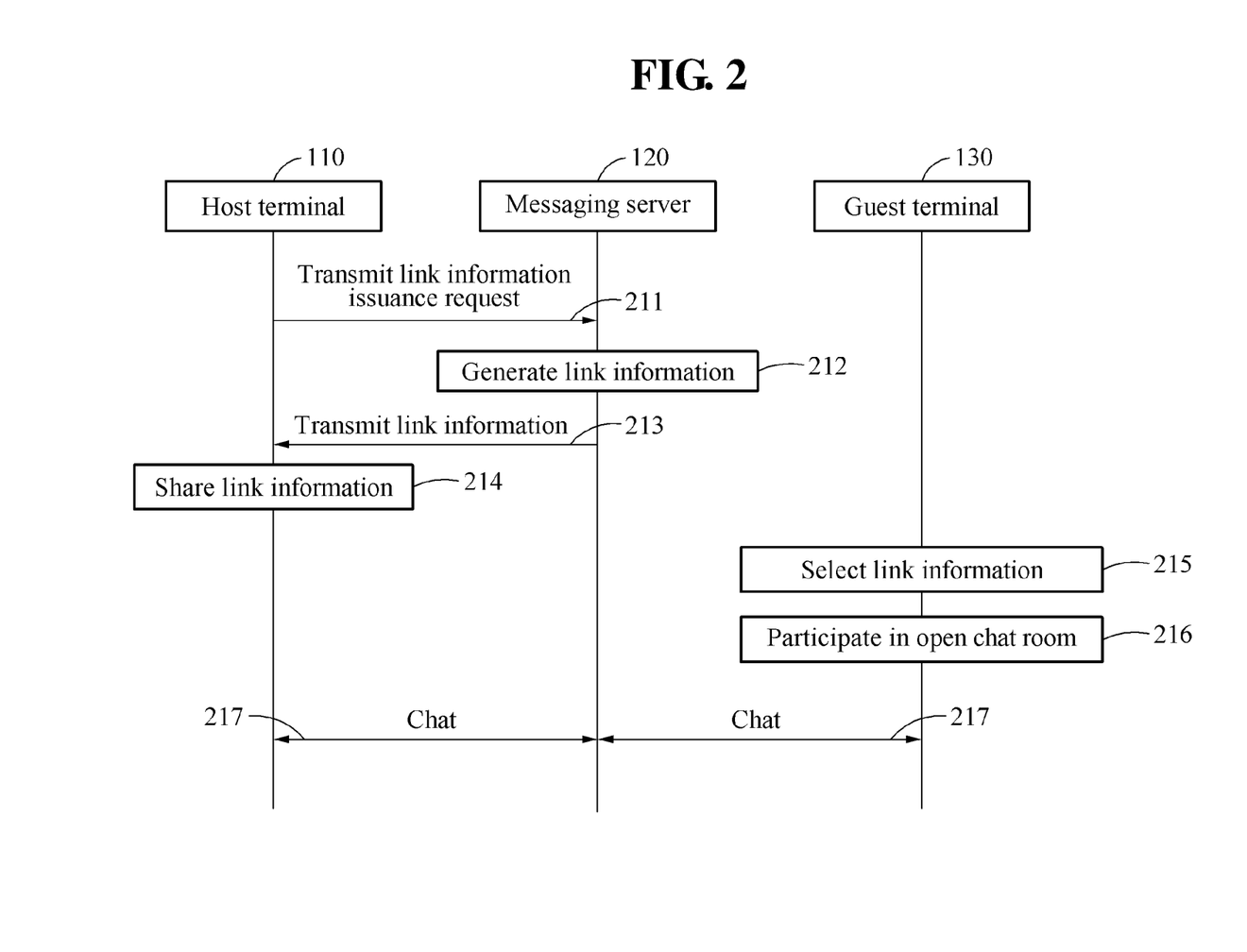
FIG. 2 is a diagram illustrating a messaging service providing method according to an example embodiment.

FIG. 2 is a diagram illustrating a messaging service providing method according to an example embodiment.

In FIG. 2, it is assumed that a host terminal 110 is one of the host terminals 110-1, 110-2, . . . , and 110-N of FIG. 1, a messaging server 120 is the messaging server 120 of FIG. 1, and a guest terminal 130 is one of the guest terminals 130-1, 130-2, . . . , and 130-M of FIG. 1. Here, a user of the host terminal 110 and a user of the guest terminal 130 may subscribe to a same messaging service, irrespective of whether the users are connected as a friend in a messaging application.

In operation 211, the host terminal 110 transmits, to the messaging server 120, a link information issuance request for issuing link information for an open chat room. The host terminal 110 may transmit the link information issuance request to the messaging server 120 through the messaging application.

The link information issuance request may include user information associated with the user of the host terminal 110, requirement information associated with the user of the guest terminal 130, type information indicating whether the open chat room is of a one-to-one type or a group type, requirement information associated with the open chat room, or connection information of the open chat room.

In operation 212, the messaging server 120 generates the link information in response to the link information issuance request. The link information is information associated with a link to the open chat room. The link information may be provided in a form, for example, a custom URL scheme, an http URL, a QR code, a highlighted text, and an icon.

In operation 213, the messaging server 120 transmits the link information to the host terminal 110.

In operation 214, the host terminal 110 shares the link information in response to a link information sharing request input by the user of the host terminal 110. For example, the host terminal 110 may share the link information by posting the link information in a posting space. The posting space is a space that is accessible by the guest terminal 130 through a wired or wireless communication network and may include, for example, a webpage (e.g., a blog, an online community, and an online café) and an online space in the messaging application through which users subscribing thereto exchange instant messages or other service applications (e.g., a social network service (SNS)) that are distinguished from the messaging application.

Here, the online space in the messaging application or the other service applications is a space that is accessible by a user subscribing to the applications through the applications. The online space may include, for example, an instant message transmitted in the messaging application, a space in which at least one piece of link information is registered to allow the guest terminal 130 to search for a previously generated open chat room and participate in the retrieved open chat room, and a space in which at least one of a text, an image, or a video is posted in the other service applications.

The user of the guest terminal 130 may input a certain keyword to the space in which at least one piece of link information is registered to identify link information associated with an open chat room for a topic of interest, and then participate in the open chat room through the identified link information. However, because the user of the host terminal 110 determines whether to share the link information in the space in which at least one piece of link information is registered in operation 214, the guest terminal 130 may not participate in the open chat room through the space in which at least one piece of link information is registered, when the user of the host terminal 110 determines that the link information is not to be shared in such a space in which at least one piece of link information is registered.

The sharing of the link information may be performed also by other terminals in addition to the host terminal 110, for example, a terminal receiving a posting request from the host terminal 110 and a guest terminal posting the shared link information. However, the sharing of the link information in such a space in which at least one piece of link information is registered by the other terminals, instead of the host terminal 110, to allow the guest terminal 130 to search for the previously generated open chat room and participate in the retrieved open chat room may be restricted. That is, the sharing of the link information in the space in which at least one piece of link information is registered may be performed only by the host terminal 110 that requests of the issuing of the link information.

In operation 215, the guest terminal 130 receives an input indicating that the link information shared in the posting space is selected by the user of the guest terminal 130. For example, the user of the guest terminal 130 may verify the link information shared by the host terminal 110 in the webpage or the online space of the messaging application through which instant messages may be exchanged or the other service applications distinguished from the messaging application, and select the link information.

In operation 216, the user of the guest terminal 130 participates in the open chat room through the link information. When the link information is selected by the user of the guest terminal 130, the messaging application installed in the guest terminal 130 may be executed.

For example, in a case in which the user of the guest terminal 130 selects custom URL scheme-type link information, the guest terminal 130 may execute the messaging application to allow the user of the guest terminal 130 to participate in the open chat room corresponding to the link information. For another example, in a case in which the user of the guest terminal 130 selects another type link information, for example, http URL, QR code, highlighted text, and icon type link information, and the guest terminal 130 receives an input indicating that the user of the guest terminal 130 selects the other type link information, the guest terminal 130 may access a predetermined webpage and execute the messaging application through the custom URL scheme-type link information included in the webpage to allow the user of the guest terminal 130 to participate in the open chat room.

However, according to an example, the user of the guest terminal 130 may not participate in the open chat room through the link information. For example, when the user of the guest terminal 130 is blocked by the user of the host terminal 110, or vice versa, in the messaging application, the user of the guest terminal 130 may not participate in the open chat room. The user of the host terminal 110 may set a block function, for example, a function of 'block friend' and 'reject receiving messages,' in order not to chat with the user of the guest terminal 130 in the messaging application. Thus, although the blocked user of the guest terminal 130 selects the link information shared by the host terminal 110, the blocked user may be restricted in participating in the open chat room. In addition, when a report of usage limit for the user of the guest terminal 130 is received in the messaging application, the user of the guest terminal 130 may be restricted in participating in the open chat room. The report may be received from the host terminal 110 or a third terminal using the messaging application.

Also, in a case in which a restriction is set on the link information, the user of the guest terminal 130 may not participate in the open chat room through the link information. For example, in a case in which the link information is set to be inactivated by the user of the host terminal 110, or the link information is deleted by the user of the host terminal 110, the user of the guest terminal 130 may be restricted in participating in the open chat room although the user of the guest terminal 130 selects the link information. Also, in a case in which the number of open chat rooms generated through the link information exceeds a maximum allowable number of open chat rooms, or the number of users of guest terminals participating in an open chat room exceeds a maximum allowable number of users of guest terminals, the user of the guest terminal 130 may be restricted in participating in the open chat room although the user of the guest terminal 130 selects the link information.

The open chat room may be generated when the link information is generated by the messaging server 120 in operation 212 in response to the link information issuance request, or generated when the user of the guest terminal 130 selects the link information posted in the posting space in operation 215 and the link information is generated by the messaging server 120 in response to the selection.

In operation 217, the user of the host terminal 110 and the user of the guest terminal 130 exchange instant messages in the open chat room generated by the messaging server 120.

Figure 3:
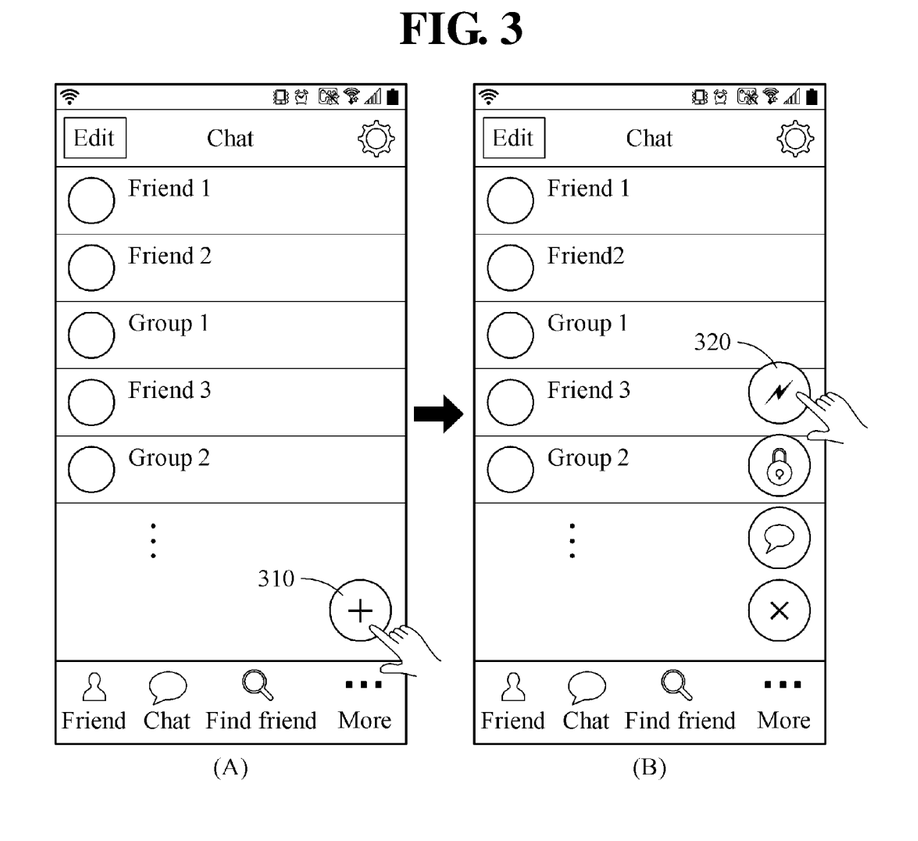
FIGS. 3 and 4 are diagrams illustrating examples of how a host terminal requests an issuance of link information for an open chat room according to an example embodiment.
Figure 4:
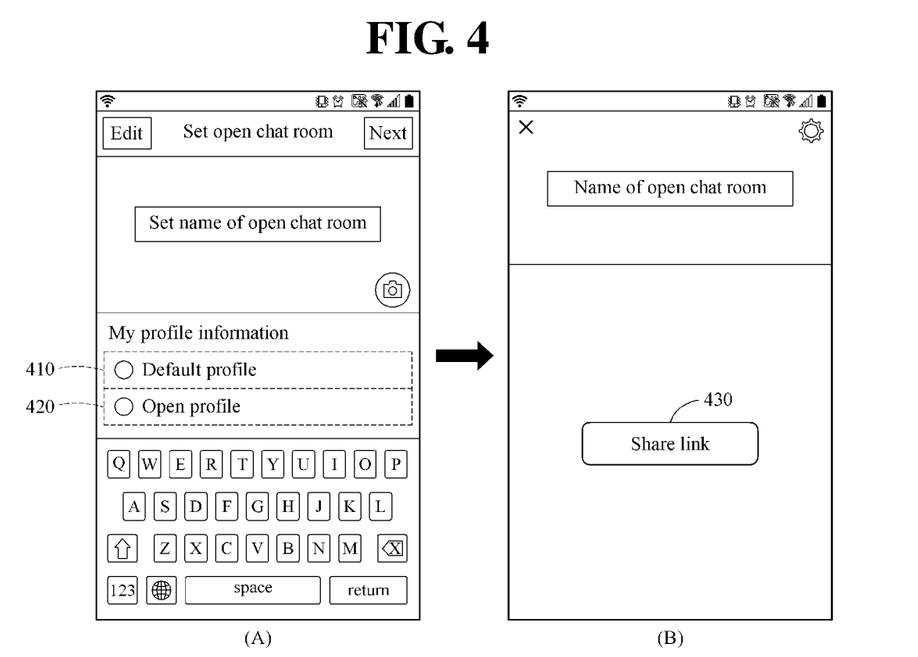

FIGS. 3 and 4 are diagrams illustrating examples of how a host terminal requests issuing of link information for an open chat room according to an example embodiment.

(A) and (B) of FIG. 3 illustrate examples of how a host terminal receives an input for generating an open chat room.

(A) of FIG. 3 illustrates a list of example general chat rooms including an one-to-one type chat room and a group type chat room. A user may select an identifier 310 for an additional function that is displayed in a messaging application. (B) of FIG. 3 illustrates a screen on which one or more identifiers including an identifier 320 for generating an open chat room are displayed in the messaging application, after the identifier 310 for the additional function is selected. When a user selects the identifier 320 for generating an open chat room, the messaging application may display a screen for requesting issuing of link information corresponding to the open chat room.

The examples illustrated in (A) and (B) of FIG. 3 are provided merely as an illustrative example of an interface for receiving an input for generating an open chat room. Thus, only by clicking a portion displayed in the messaging application or applying an interaction to such a portion, the messaging application may display such an interface for requesting issuing of link information.

(A) of FIG. 4 illustrates an example interface for setting a profile to be used in an open chat room. A user may select one profile from a default profile 410 and an open profile 420.

The default profile 410 is a basic profile to be set when a user subscribes to a messaging service, and a profile to be used when the user chats with a user who is a friend of the user in a messaging application. The open profile 420 is to be a profile to be set when a link information issuance request for issuing link information for the open chat room is transmitted to a messaging server or when the user participates in the open chat room, and may be additionally set in addition to the default profile 410. In general, dissimilar to a default profile using personal information, for example, a face image of a user, an open profile may not include such personal information. Thus, by additionally setting such an open profile, a risk of a leak of personal information of a user of a host terminal may be minimized.

(A) of FIG. 4 illustrates a single open profile 420 for convenience of description. However, a plurality of open profiles may be displayed on a screen for setting a profile of a user. Alternatively, when a preset open profile is absent, an identifier for adding an open profile of a user, in lieu of the open profile 420 illustrated in (A) of FIG. 4, may be displayed. By selecting such an identifier for adding of the open profile, a new open profile may be set.

In addition, a user may set information of an open chat room in a screen illustrated in (A) of FIG. 4. The information of the open chat room may include at least one of a description of link information for the open chat room, a name of the open chat room, or image information to be applied to the open chat room (e.g., an image file and an address from which the image file is to be extracted). The information of the open chat room may be used for a user of a guest terminal or a user of a host terminal to search for the link information associated with the open chat room. The information of the open chat room may be set in a process of requesting issuing of the link information, separately from a process of setting the open profile 420. For example, in a case in which a plurality of images is to be applied, a plurality of image covers may be set in the open chat room.

(B) of FIG. 4 illustrates an example screen of receiving, as an input, a link information sharing request from a user. For example, the user may input the link information sharing request by selecting an identifier 430 for sharing link information that is displayed in a messaging application. For another example, the user may input the link information sharing request by applying an interaction for sharing the link information to a portion of the messaging application.

Figure 5:
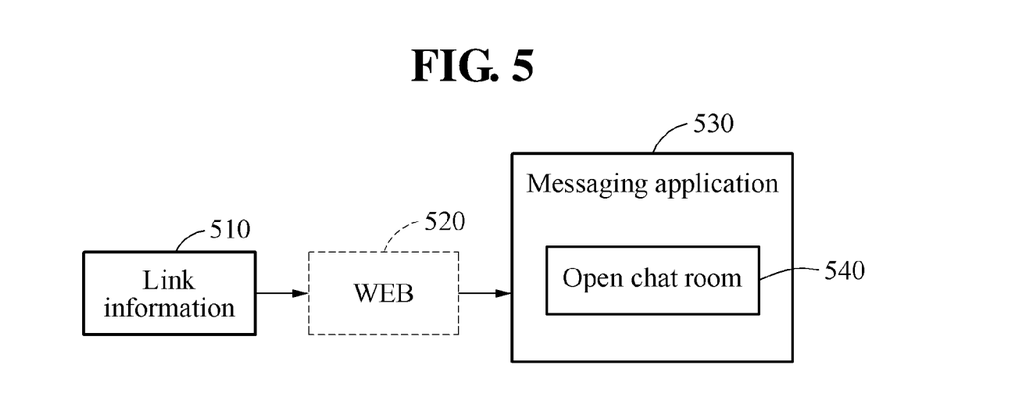
FIG. 5 is a diagram illustrating an example of how a guest terminal enters an open chat room according to an example embodiment.

FIG. 5 is a diagram illustrating an example of how a guest terminal enters an open chat room according to an example embodiment.

A guest terminal may verify link information 510 shared in a posting space. The posting space is a space that is accessible by the guest terminal through a wired or wireless communication network and may include, for example, a webpage and an online space in a messaging application through which subscribed users exchange instant messages or in other service applications, for example, an SNS, that are distinguished from the messaging application.

The link information 510 is information associated with a link to an open chat room 540 and is provided in a form, for example, a custom URL scheme, an http URL, a QR code, a highlighted text, and an icon.

The Custom URL scheme is a form of link information that executes or implements an application. For example, when the link information 510 of such a custom URL scheme form is selected, the guest terminal may execute a messaging application 530 and allow a user of the guest terminal to participate in the open chat room 540 corresponding to the link information 510. That is, when an input indicating that the link information 510 of the custom URL scheme form is selected, the guest terminal may execute the messaging application 530 through the link information 510 without a WEB 520 to allow the user of the guest terminal to participate in the open chat room 540.

The http URL is a form of link information to be connected to a predetermined webpage. For example, when the link information 510 of such an http URL form is selected, the guest terminal may be connected to the WEB 520 and execute the messaging application 530 through link information of a custom URL scheme form. The guest terminal may then allow the user to participate in the open chat room 540 corresponding to the link information 510.

The QR code is a 2D barcode that represents information in a black and white grid pattern and may include, for example, information linked to a predetermined webpage. For example, when the link information 510 of such a QR code is selected, the guest terminal may be connected to the WEB 520 and execute the messaging application 530 through link information of a custom URL scheme form. The guest terminal may then allow the user to participate in the open chat room 540 corresponding to the link information 510.

The highlighted text may be in a form of a text with an outward shape of all or part of the text being modified, and include link information linked to a predetermined webpage. The icon is a pictorial symbol that indicates an object, a facility, a form, a concept, and the like as a symbolic illustration to be readily recognizable, and may include information linked to a predetermined webpage. For example, when the link information 510 of such a form of the highlighted text or the icon is selected, the guest terminal may be connected to the WEB 520 and execute the messaging application 530 through link information of a custom URL scheme form. The guest terminal may then allow the user to participate in the open chat room 540 corresponding to the link information 510 in the messaging application 530.

For example, when the open chat room 540 is a one-to-one type open chat room, the user of the guest terminal may participate in a one-to-one type open chat room through the link information 510. For another example, when the open chat room 540 is a group type open chat room, the user of the guest terminal may select a corresponding type when participating in the open chat room 540 through the link information 510. Although the open chat room 540 is set to be the group type open chat room, the user of the guest terminal may select a one-to-one chat, and participate in the one-to-one type open chat room to chat with a user of a host terminal one-to-one.

Alternatively, the user of the guest terminal may search for the open chat room 540 in which the user desires to participate through a hashtag, and then participate in the open chat room 540. The user of the guest terminal may search for link information associated with the open chat room 540. In detail, the user of the guest terminal may search for link information matching the hashtag, and then participate in the open chat room 540 through the retrieved link information. To search for the link information, a description of the link information that matches the hashtag may be used. In such a case, the user of the guest terminal may use the hashtag as the link information 510, and participate in the open chat room 540 corresponding to the hashtag.

Alternatively, when there are a plurality of open chat rooms in which the user may participate through the link information 510, the user of the guest terminal may select one from the open chat rooms corresponding to the link information 510, and then participate in the selected open chat room. Here, the user of the guest terminal may verify a name of each of the open chat rooms or a classification of the open chat rooms to select one from the open chat rooms, and participate in the selected open chat room.

Alternatively, the user of the guest terminal may participate in the open chat room 540 based on a token issued from the WEB 520. The user of the guest terminal may receive the issued token from the WEB 520 connected through the link information 510 and apply the token to the messaging application 530 to participate in the open chat room 540.

Figure 6:
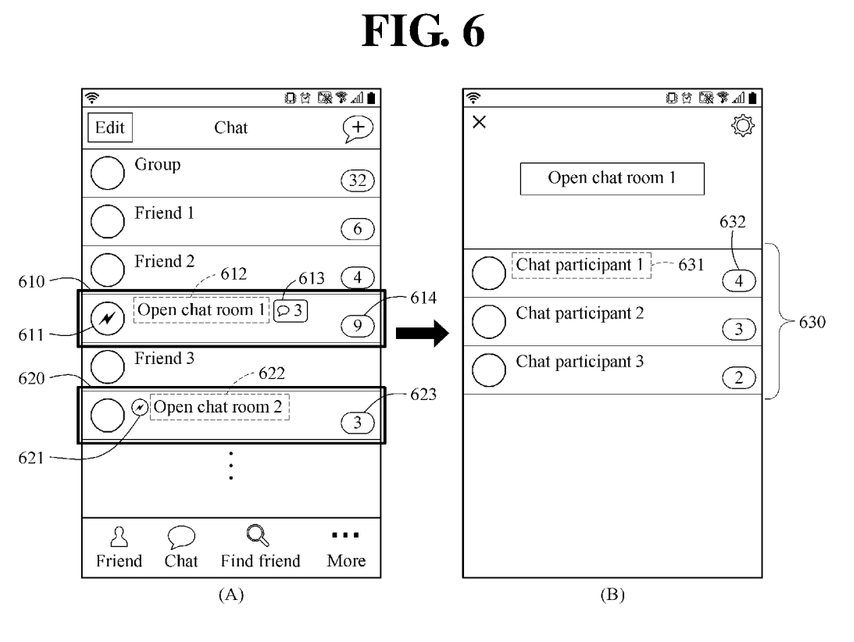
FIG. 6 is a diagram illustrating an example of how an open chat room is indicated in a list according to an example embodiment.

FIG. 6 is a diagram illustrating an example of how an open chat room is indicated in a list according to an example embodiment.

(A) of FIG. 6 illustrates an example list of chat rooms including a general chat room and an open chat room.

A first open chat room 610 is displayed as a single group of a plurality of open chat rooms corresponding to link information, when there are a plurality of open chat rooms corresponding to link formation. For example, the first open chat room 610 may be displayed along with an identifier 611 indicating an open chat room in which a user participates as a user of a host terminal, a name 612 of the first open chat room 610, a number 613 of the open chat rooms corresponding to the link information, a number 614 of new messages received. For example, the number 613 of the open chat rooms corresponding to the link information for the first open chat room 610 is three as illustrated in (A) of FIG. 6. That is, the three open chat rooms corresponding to the link information may be grouped into a single group and displayed to the host terminal as the first open chat room 610.

A second open chat room 620 indicates at least one open chat room in which a user participates as a user of a guest terminal. For example, the second open chat room 620 may be displayed along with an identifier 621 indicating an open chat room in which a user participates as a user of a guest terminal, a name 622 of the open chat room 620, and a number 623 of new messages received.

At least one open chat room included in the first open chat room 610 and at least one open chat room included in the second open chat room 620 may be displayed as being included in a single open chat room group. That is, an open chat room in which a user participates as a user of a host terminal and an open chat room in which a user participates as a user of a guest terminal may be displayed as a single open chat room group.

(B) of FIG. 6 illustrates an example list of a plurality of open chat rooms corresponding to link information in the first open chat room 610, when the first open chat room 610 is selected.

When a user of a host terminal selects the first open chat room 610, the open chat rooms corresponding to the link information may be displayed. For example, a name or an ID 631 of a user of a guest terminal and a number 632 of new messages received may be displayed. Although not illustrated in (B) of FIG. 6, the open chat rooms corresponding to the link information may include a group type open chat room in addition to a one-to-one type open chat room.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible for each processor.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A messaging service providing method to be performed by a host terminal, the method comprising:
   transmitting, to a messaging server, a link information issuance request for issuing link information for an open chat room through a messaging application;
   receiving, from the messaging server, the link information generated in response to the link information issuance request;
   sharing the link information in response to a link information sharing request input by a user of the host terminal;
   displaying the open chat room distinguishable from a general chatroom; and
   performing a chat between the user of the host terminal and a user of a guest terminal participating in the open chat room through the shared link information,
   wherein the user of the guest terminal and the user of the host terminal subscribe to a messaging service provided through the messaging server,
   wherein the open chat room is accessible by the guest terminal regardless of whether the user of the guest terminal is a friend of the user of the host terminal in the messaging application,
   wherein the link information issuance request includes profile user information associated with the user of the host terminal and requirement information associated with the user of the guest terminal
   wherein the profile information is set by selecting either a default profile or an open profile of the user of the host terminal, and
   wherein the requirement information includes entry requirement set by information of the user of the guest terminal.

2. The method of claim 1, wherein the link information issuance request further includes type information indicating whether the open chat room is a one-to-one type or a group type.

3. The method of claim 2, wherein, when the type information indicates that the open chat room is a one-to-one type, and when at least two guest terminals receive inputs indicating that the link information is selected, a plurality of open chat rooms corresponding to the link information are generated, and each of the open chat rooms is a one-to-one type open chat room for each of the guest terminals to chat with the host terminal.

4. The method of claim 1, wherein the open profile of the user of the host terminal in the open chat room is set to be different from the default profile of the user of the host terminal in the general chat room.

5. The method of claim 1, wherein the link information is shared through a posting space including at least one of a webpage accessible by the guest terminal or an online space in the messaging application or another service application different from the messaging application.

6. The method of claim 1, wherein the host terminal is configured to:
   display the number of open chat rooms corresponding to the link information, or the number of new messages received in the open chat room corresponding to the link information,
   when there are a plurality of open chat rooms corresponding to the link information, display at least one group into which the open chat rooms are grouped, and when the displayed at least one group is selected, display a list of open chat rooms included in the selected group.

7. The method of claim 1, wherein, when the user of the host terminal leaves the open chat room, the open chat room is deleted from the messaging server after a predetermined period elapses.

8. A messaging service providing method to be performed by a guest terminal, the method comprising:
receiving an input indicating that link information posted in a posting space is selected; and
performing a chat between a user of the guest terminal and a user of a host terminal by participating in an open chat room generated by a messaging server through the link information,
wherein the user of the guest terminal and the user of the host terminal subscribe to a messaging service provided by the messaging server in association with a messaging application,
wherein the open chat room is accessible by the guest terminal regardless of whether the user of the guest terminal is a friend of the user of the host terminal in the messaging application,
wherein the link information issuance request includes profile information associated with the user of the host terminal and requirement information associated with the user of the guest terminal,
wherein the profile information is set by selecting either a default profile or an open profile of the user of the host terminal, and
wherein the requirement information includes entry requirement set by information of the user of the guest terminal.

9. The method of claim 8, wherein the link information issuance request further includes type information indicating whether the open chat room is a one-to-one type or a group type, and
wherein, when the type information indicates that the open chat room is a one-to-one type, and when at least two guest terminals receive inputs indicating that the link information is selected, a plurality of open chat rooms corresponding to the link information are generated, and each of the open chat rooms is a one-to-one type open chat room for each of the guest terminals to chat with the host terminal.

10. The method of claim 8, wherein the open profile of the user of the host terminal in the open chat room is set to be different from the default profile of the user of the host terminal in the general chat room.

11. A messaging service providing method to be performed by a messaging server, the method comprising:
generating link information in response to a link information issuance request for issuing the link information for an open chat room; and
providing a messaging service through the open chat room in which a chat between a user of a guest terminal selecting the link information and a user of a host terminal is performed,
wherein the user of the guest terminal and the user of the host terminal subscribe to the messaging service provided through the messaging server,
the open chat room is accessible by the guest terminal regardless of whether the user of the guest terminal is a friend of the user of the host terminal in the messaging application,
wherein the link information issuance request includes profile information associated with the user of the host terminal and requirement information associated with the user of the guest terminal,
wherein the profile information is set by selecting either a default profile or an open profile of the user of the host terminal, and
wherein the requirement information includes entry requirement set by information of the user of the guest terminal.

12. The method of claim 11, wherein the link information issuance request further includes type information indicating whether the open chat room is a one-to-one type or a group type, and
wherein, when the type information indicates that the open chat room is a one-to-one type, and when at least two guest terminals receive inputs indicating that the link information is selected, a plurality of open chat rooms corresponding to the link information are generated, and each of the open chat rooms is a one-to-one type open chat room for each of the guest terminals to chat with the host terminal.

13. The method of claim 11, wherein the link information issuance request further includes at least one of user information associated with the user of the host terminal, requirement information associated with the user of the guest terminal, requirement information associated with the open chat room, or connection information of the open chat room.

14. The method of claim 11, wherein, when a user of a host terminal and a plurality of users of guest terminals are participating in the open chat room through the link information, the user of the host terminal participates in an open chat room of a one-to-one type to chat with each of the users of the guest terminals, or participates in an open chat room of a group type to chat with the users of the guest terminals.

15. The method of claim 11, wherein, when a plurality of users of host terminals and a plurality of users of guest terminals are participating in the open chat room through the link information, the user of the host terminal is a user among a plurality of users of host terminals associated with a virtual entity, and is allocated to participate in an open chat room that is the same as an open chat room in which at least one user among the users of the guest terminals is participating and chatting.

16. The method of claim 15, wherein the user of the host terminal is allocated based on an order in which the users of the host terminals associated with the virtual entity log into a messaging application, allocated based on the number of open chat rooms previously allocated to the users of the host terminals associated with the virtual entity, or allocated based on the number of users of guest terminals participating in the open chat rooms previously allocated to the users of the host terminals associated with the virtual entity.

17. The method of claim 11, wherein the host terminal is a terminal requesting the issuing of the link information, a terminal associated with a virtual entity using the open chat room through the link information, or a terminal designated by the link information.

18. A non-transitory computer-readable medium storing program instructions for controlling a processor to perform the method of claim 1.

19. A non-transitory computer-readable medium storing program instructions for controlling a processor to perform the method of claim 8.

20. A non-transitory computer-readable medium storing program instructions for controlling a processor to perform the method of claim 11.

* * * * *